United States Patent
Diwane et al.

(10) Patent No.: US 10,225,774 B2
(45) Date of Patent: Mar. 5, 2019

(54) CARRIER NETWORK ACCESS USING MULTIPLE NETWORK INTERFACES

(71) Applicant: Cisco Technology, Inc., San Jose, CA (US)

(72) Inventors: Shivaji P. Diwane, Pleasanton, CA (US); Vivek Datar, Cupertino, CA (US); Jeslin Antony Puthenparambil, San Jose, CA (US); Sendilvadivu Ganesan, Milpitas, CA (US); Keith Dsouza, South San Francisco, CA (US); Sundara Paal Rani Thirumalaippan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 36 days.

(21) Appl. No.: 15/478,367

(22) Filed: Apr. 4, 2017

(65) Prior Publication Data
US 2018/0288662 A1  Oct. 4, 2018

(51) Int. Cl.
*H04W 24/08* (2009.01)
*H04W 36/06* (2009.01)

(52) U.S. Cl.
CPC ........... *H04W 36/06* (2013.01); *H04W 24/08* (2013.01)

(58) Field of Classification Search
CPC .. H04B 7/18541; H04B 7/024; H04B 7/0413; H04B 7/0452; H04B 7/0495; H04B 2201/70726; H04B 7/216; H04B 7/2668; H04B 7/2618; H04B 7/2643; H04L 47/767; H04L 1/0002; H04L 1/20; H04L 1/0048; H04L 1/06; H04W 36/00; H04W 36/0005; H04W 36/0016; H04W 36/0083; H04W 36/0088; H04W 36/0094; H04W 28/0257; H04W 28/04; H04W 16/28; H04W 72/0446; H04W 48/12; H04W 48/16;
(Continued)

(56) References Cited

U.S. PATENT DOCUMENTS

| 5,008,925 A * | 4/1991 | Pireh .................... H04B 1/406 455/340 |
| 7,746,825 B2 * | 6/2010 | Olvera-Hernandez .................... H04W 36/005 370/331 |

(Continued)

OTHER PUBLICATIONS

"On-Board WiFi on Trains", https://www.fluidmesh.com/solutions/on-board-wifi-for-trains/, 3 pages, Accessed Dec. 27, 2016, Fluidmesh Networks LLC.
(Continued)

*Primary Examiner* — Sharad Rampuria
(74) *Attorney, Agent, or Firm* — Behmke Innovation Group; James Behmke; Stephen Lebarron (57) ABSTRACT

In one embodiment, a device, having a first and a second network interface, detects a switchover by the first network interface from using a preferred wireless access standard to access a carrier network to using a second wireless access standard to access the carrier network. The device identifies when the preferred wireless access standard is again available from the carrier network using the second network interface and causes the first network interface to switch to using the preferred wireless access standard, based on identification by the second network interface that the preferred wireless access standard is again available from the carrier network.

12 Claims, 6 Drawing Sheets

(58) Field of Classification Search
CPC ..... H04W 48/18; H04W 48/20; H04W 88/06; H04J 3/1694
See application file for complete search history.

(56) References Cited

U.S. PATENT DOCUMENTS

| | | | |
|---|---|---|---|
| 7,957,352 B2* | 6/2011 | Vanghi | H04W 36/0066 370/335 |
| 8,149,790 B2 | 4/2012 | Purkayastha et al. | |
| 8,331,315 B2 | 12/2012 | Purkayastha et al. | |
| 8,781,475 B1* | 7/2014 | McKeeman | H04W 36/32 370/331 |
| 8,923,858 B2 | 12/2014 | Perets et al. | |
| 9,210,625 B1* | 12/2015 | Lovlekar | H04W 36/0066 |
| 9,301,252 B2 | 3/2016 | Narasimha et al. | |
| 2013/0100928 A1* | 4/2013 | Matsumori | H04W 36/24 370/331 |

OTHER PUBLICATIONS

"UMTS Modems—Supported AT Command Reference", https://www.sierrawireless.com/resources/documents/support/2130617_supported_at_command_reference-v2.4.pdf, Rev. 2.4, 66 pages, Jan. 2008, Sierra Wireless.

* cited by examiner

CARRIER NETWORK ACCESS USING MULTIPLE NETWORK INTERFACES

TECHNICAL FIELD

The present disclosure relates generally to computer networks, and, more particularly, to techniques for switching to a preferred standard to access a carrier network.

BACKGROUND

The Internet of Things (IoT) is the internetworking of devices or objects (aka "things", e.g., sensors, actuators, nodes, vehicles, etc.) that collect and exchange data, control objects, and process data. Many IoT networks are formed on low-power lossy networks (LLNs), e.g., sensor networks. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device, having a first and a second network interface, detects a switchover by the first network interface from using a preferred wireless access standard to access a carrier network to using a second wireless access standard to access the carrier network. The device identifies when the preferred wireless access standard is again available from the carrier network using the second network interface and causes the first network interface to switch to using the preferred wireless access standard, based on identification by the second network interface that the preferred wireless access standard is again available from the carrier network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
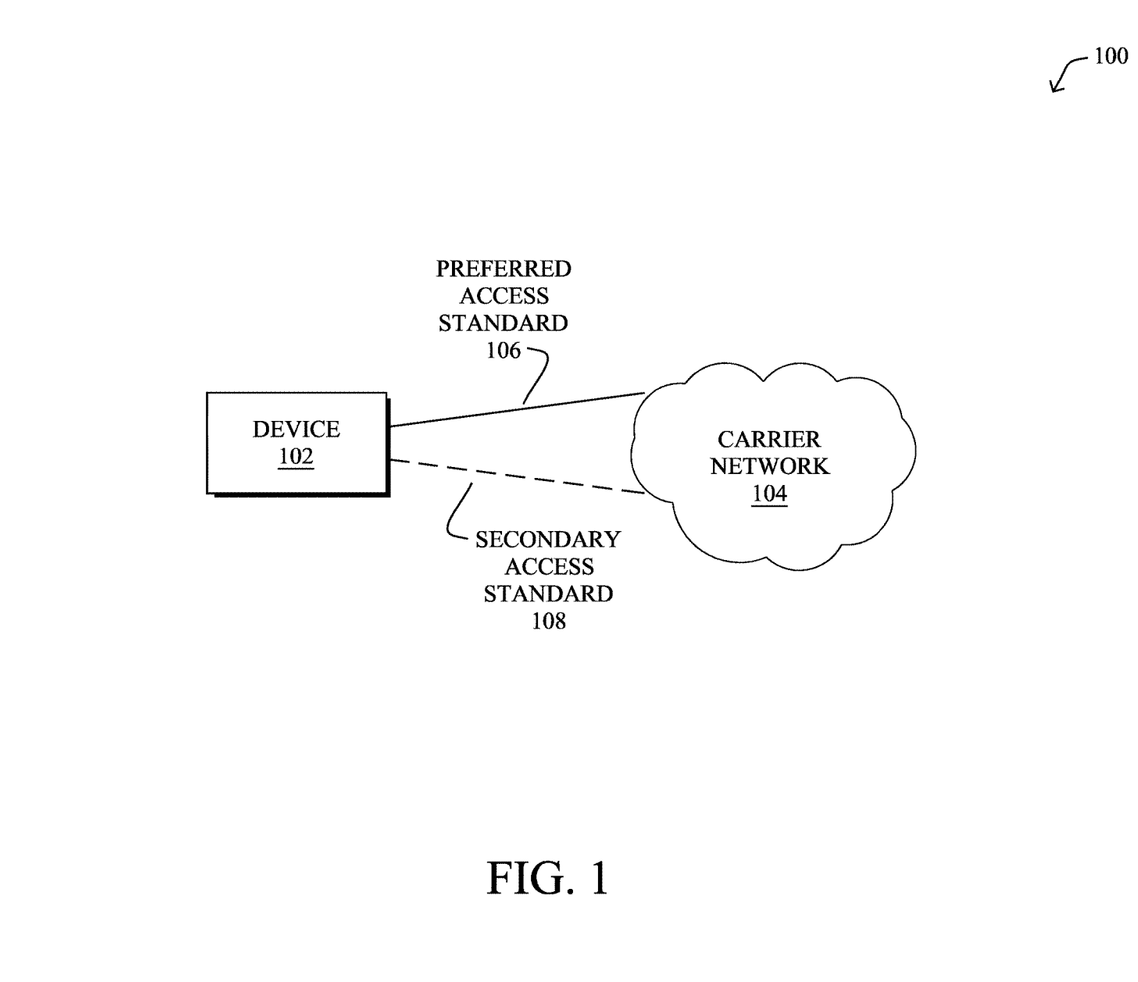
FIG. 1 illustrates an example computer network.

FIG. 1 illustrates an example system 100, according to various embodiments of the present disclosure. As shown, device 102 may connect to carrier network 104 using one of several access standards available for that network, including, for example, wireless access standards such as 4G (e.g., LTE, etc.), 3G (e.g., EVDO, UMTS, etc.) or 2G (e.g., 1xRTT, GSM, etc.). In general, more than one wireless access standard may be available for use in order to access a particular carrier network. However, one standard may be preferred over the others based on, for example, cost, local availability, speed, reliability, equipment type, etc. For example, device 102 may access carrier network 104 using preferred access standard 106 (e.g., 4G) rather than secondary access standard 108 (e.g., 3G), in order to provide a more reliable and faster connection.

Carrier network 104 may be any known communication network available for providing media, data, and/or other communication services to users via a service provider (e.g., a acellular or other telecommunication provider). Device 102 may be any device capable of accessing carrier network 104, including, for example, telephony equipment, a router, a community access television (CATV) or satellite receiver, a mobile computing devices such as a tablet device, a smartphone, a wearable electronic device (e.g., a smart watch, a head up display, etc.), or a personal computer, such as a laptop or desktop computer.

In various embodiments, system 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Thus, in some embodiments, device 102 may be an IoT device, such as a home or building device including a security camera, a video/audio recording device, a thermostat, a kitchen appliance, a bathroom scale, etc. in a local network (e.g., a home or office local area network, LAN, or wireless local area network, WLAN). In further cases, device 102 may be an IoT network router having one or more network interfaces (e.g., modems) that enable a network connection between an IoT device and carrier network 104, as discussed in more detail below.

Notably, device 102 may be a device within a Low-Power and Lossy Network (LLN), which is a class of network in which both routers and their interconnections are constrained. For example, LLN routers typically operate with constraints, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point).

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
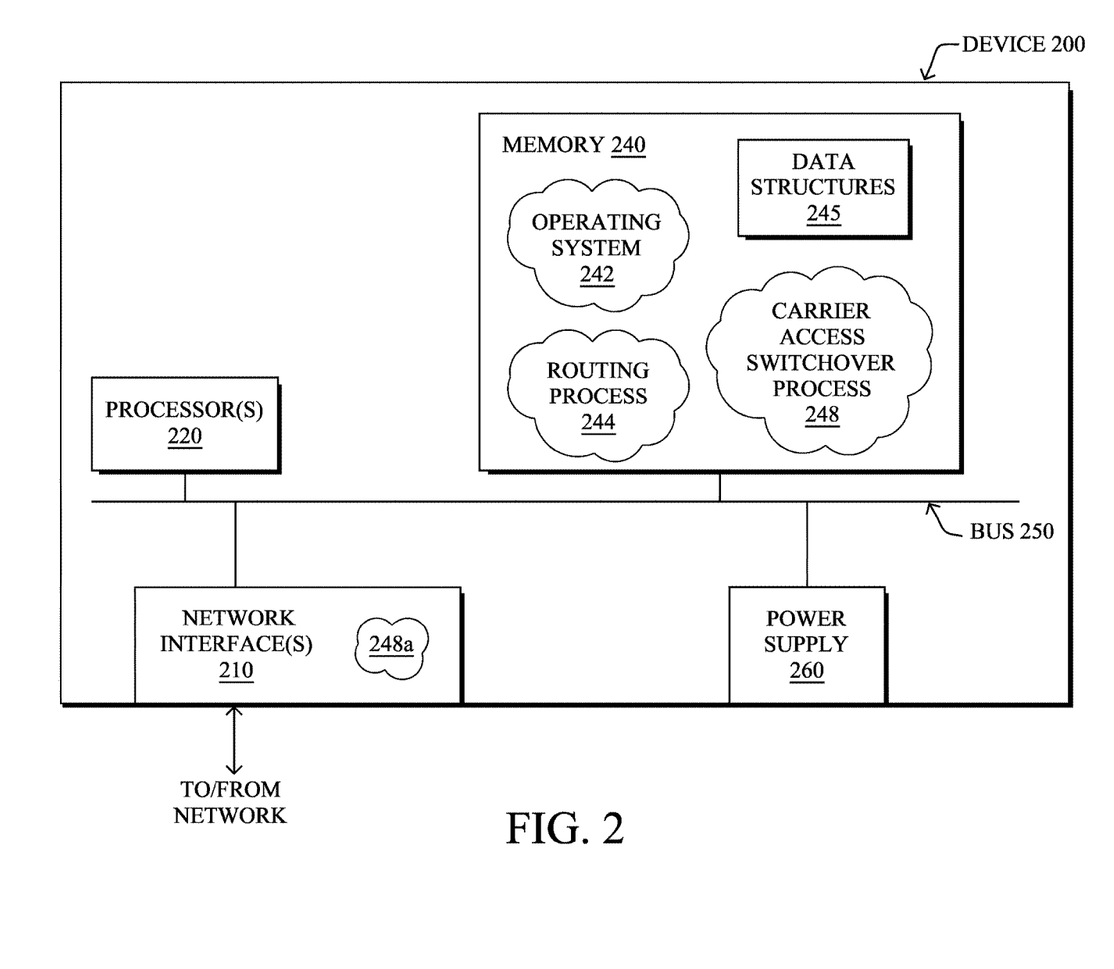
FIG. 2 illustrates an example device/node.

FIG. 2 is a schematic block diagram of an example device 200 that may be used with one or more embodiments described herein, such as device 102 shown in FIG. 1. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over links coupled to carrier network 104. The network interfaces may be configured to transmit and/or receive data using a variety of different communication protocols (e.g., wireless access standards). Notably, a physical network interface 210 may also be used to implement one or more virtual network interfaces, such as for virtual private network (VPN) access, known to those skilled in the art. Note, further, that the device may have two different types of network interfaces 210, e.g., wireless and wired/physical connections, and that the view herein is merely for illustration.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which is typically resident in memory 240 and executed by the processor(s), functionally organizes the device by, inter alia, invoking operations in support of software processes and/or services executing on the device. These software processes and/or services may comprise routing process 244 (e.g., routing services) and an illustrative carrier access switchover process 248, as described herein. Note that while process 248 is shown in centralized memory 240, alternative embodiments provide for the process to be specifically operated within the network interfaces 210, such as a component of a MAC layer (e.g., process 248*a*).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

As described above, device 200 may include one or more network interfaces 210. In many cases, such as with some IoT routers, a given network interface may comprise a wireless modem that supports a plurality of different radio access technologies (RATs)/standards. Example RATs may include, but are not limited to, 4G (LTE), 3G (EVDO, UMTS) or 2G (1×RTT, GSM). Notably, a given wireless network interface may support a plurality of RATs that include RATs that are being phased out of use over time.

Typically, on power up, a wireless/cellular modem scans for available access to a particular carrier network and connects using the best available access standard (e.g., using 4G LTE over 3G, if available). In turn, when there is a loss of radio coverage on the selected/preferred RAT, or if the network becomes too congested, the modem may then scan and attach to the carrier network using the next best available technology. For example, if a 4G connection drops off, the modem may connect using 3G instead. However, if the conditions are resolved and the coverage on the preferred technology becomes available again, a typical modem will not immediately switch RATs and reconnect to the preferred RAT, instead imposing that a "no data" period be observed before switching technologies. Thus, the device may continue to use the inferior/non-preferred technology for some period of time after the superior/preferred technology is available and affecting performance (e.g., the slower data rates may affect data center backups, etc.).

For example, some LLNs may include as many as 1200 routers installed across a large geographic area, many in remote locations where coverage to connect to carrier networks using a preferred access standard coverage (e.g., LTE) is unreliable. These modems may reselect from the preferred standard to a secondary standard (e.g., EVDO) due to an outage on the preferred network and would continue to remain there until there is "no data" going over the cellular interface for 10 seconds.

It is not always convenient or, in some cases, even possible to stop data from being sent/received over the cellular interface for the required period of time, such as, for example, by shutting the cellular interface. For example, for many IoT networks, routers may have an entire LAN network behind them, and it would not be possible to provide a window of absolutely no traffic going over the cellular interface. Furthermore, even for less active routers for which the needed quiet period may be possible, there is no way to readily determine when to give the modem a chance to reselect to the best technology.

In a more specific example, an IoT router may initially access a carrier network using a preferred wireless access standard (e.g., LTE) but may need to switch over to using a secondary standard (e.g., UMTS/EVDO) due to one of the above conditions. If a "no data" period can be provided (such as by shutting the cellular interface for 10 seconds) and the preferred access standard coverage is not available, then the modem will have to continue to access the carrier network using the secondary standard. Switching back to the preferred standard becomes a hit-or-miss prospect, with "no data" periods being created in the hope that the modem will be able to switch back over to using the preferred standard. This would result in a customer unnecessarily having to continue to access the carrier network using a relatively inferior standard and experiencing significantly slower data rates that may cause issues with data center backups etc.

Carrier Network Access Using Multiple Network Interfaces

The techniques herein provide for an IoT device (e.g., an IoT router) having multiple embedded network interfaces (e.g., modems) having access to a carrier network. Based on certain trigger events, one of the network interfaces may switch over from a primary to a secondary access standard to access the carrier network (e.g., due to loss of coverage, etc.). One of the other network interfaces may monitor for when the preferred standard is again available and may instruct the first network interface to attempt a switchover back to the initial technology. The techniques thereby combine and use hardware and software features in order to make an intelligent decision of when to attempt to switch back to the using the preferred access standard.

Illustratively, the techniques described herein may be performed by hardware, software, and/or firmware, such as in accordance with the carrier switchover process 248, which may include computer executable instructions executed by the processor 220 (or independent processor of interfaces 210) to perform functions relating to the techniques described herein, e.g., in conjunction with routing process 244.

Specifically, according to one or more embodiments of the disclosure, a device, having a first and a second network interface, detects a switchover by the first network interface from using a preferred wireless access standard to access a carrier network to using a second wireless access standard to access the carrier network. The device identifies when the preferred wireless access standard is again available from the carrier network using the second network interface and causes the first network interface to switch to using the preferred wireless access standard, based on identification by the second network interface that the preferred wireless access standard is again available from the carrier network.

Operationally, FIGS. 3A-3E illustrate various aspects of an example carrier network switchover using the techniques described herein. As generally shown, system 300 may include device 302 (e.g., an IoT router) having multiple network interfaces, such as first interface/modem 310 and second interface/modem 320. Note that, while dual modems are shown, this is for illustrative purposes only. The device may, in some embodiments, include additional modems and/or other network interfaces.

The interfaces/modems may be configured for connection to at least one carrier network 304 using a variety of different access standards, including various wireless access standards such as, but not limited to, 4G (LTE), 3G (EVDO, UMTS) and 2G (1×RTT, GSM). These network interfaces may, in some embodiments, be operated independently using the same or different cellular interfaces. In particular, one interface/modem may be used to connect to carrier network 304 while a second interface may be used for load balancing or as a backup to each other, depending on the deployment scenario, including those described in more detail below.

Figure 3A:
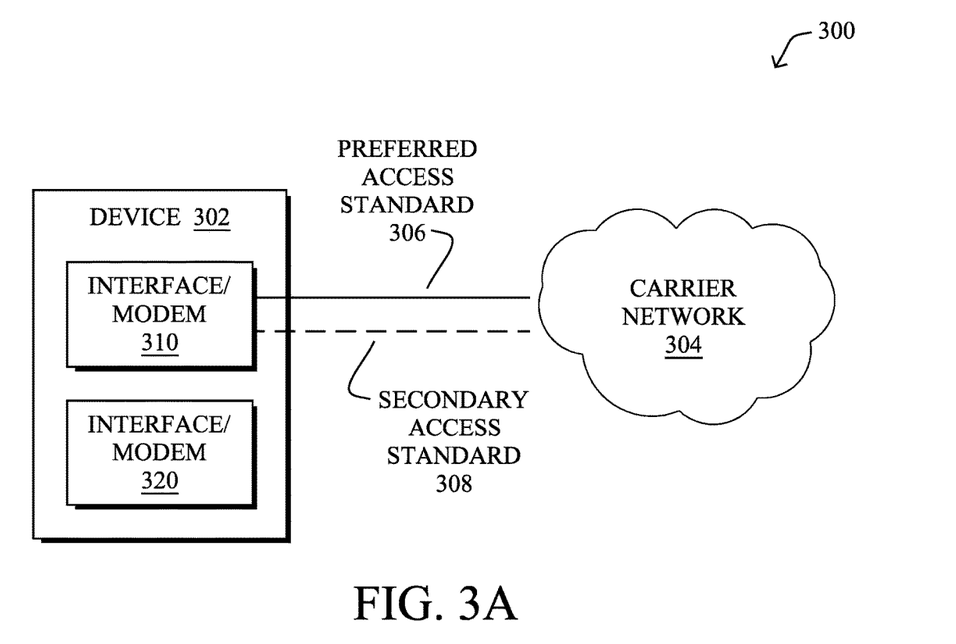
FIGS. 3A-3E illustrate an example carrier network switchover.

As shown in FIG. 3A, in various embodiments of the present disclosure, interface/modem 310 may access carrier network 304 using one access standard preferentially over a second access standard. Choice of preferred standard my by used determined or may be based on the type of device or modem. As shown, interface/modem 310 of device 302 may access the carrier network using preferred access standard 306 over secondary access standard 308.

Interface/modem 320 may access the same or different carrier network using the same or different access standards. For example, the interface/modems may be multi-RAT cellular modems embedded within device 302, each modem being capable of connecting using 4G (LTE) as the preferred access standard and 3G (UMTS) as the secondary or back-up access standard to access networks provided by the same or different carriers. In some embodiments, the carrier accessible by the interface/modem is based on a subscriber identity module (e.g., SIM card) inserted within the device. Furthermore, these modems may also be programmed with carrier specific firmware, which may include bands corresponding to the specific carrier that has been enabled, or may be programmed with a generic firmware having all bands supported by the modem being enabled. In some embodiments, the device includes search features which, when invoked, may perform a band scan on all the cellular bands that are enabled by the modem firmware to identify the available radio technology types (e.g., LTE, UMTS, GSM, etc.), the mobile country code (MMC), and the mobile network code (MNC) corresponding to the radio type.

Figure 3B:
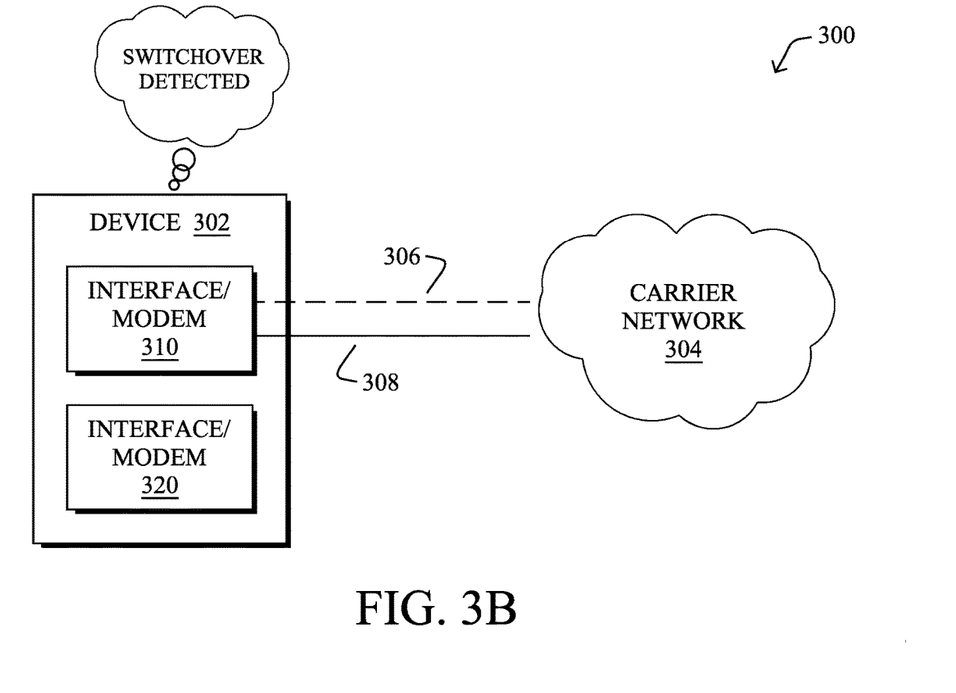

As shown in FIG. 3B, in some embodiments, device 302 may detect that access to carrier network 304 by interface/modem 310 has switched from using preferred access standard 306 to using secondary access standard 308. As discussed above, this may be caused by a variety of different types of network interruptions or changes, such as, for example, lost coverage or increased network congestion. However, as also discussed above, interface/modem 310 is generally unable to determine when the preferred wireless access standard becomes available again and cannot switch back while still receiving data.

Figure 3C:
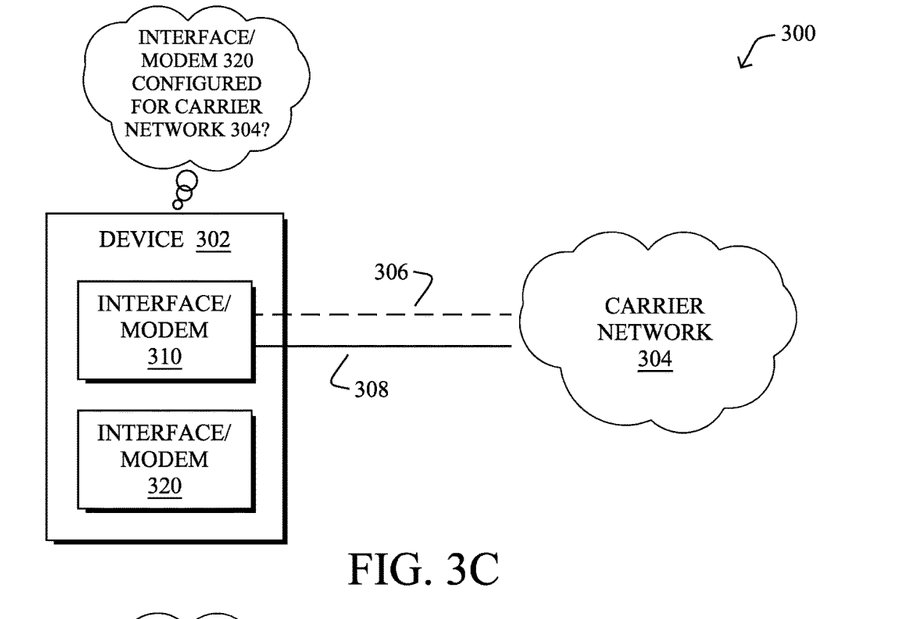

According to various embodiments of the present disclosure, device 302 may further comprise a second network access interface that may be used to determine if and when access to the carrier network is available using the preferred access standard. For example, as shown in FIG. 3C, device 302 further comprises interface/modem 320 not accessing carrier network 304. This interface may be configured to access the same or different carrier networks as interface/modem 310. Thus, in the embodiment shown, device 320 may determine whether the second modem is configured for access to carrier network 304. If the interfaces/modems are similarly configured, interface/modem 320 may be used to determine accessibility to carrier network 304. If not, the device may reconfigure or adapt interface/modem 320, such as by providing upgrades to the modem firmware, in order to monitor access to carrier network 304.

Figure 3D:
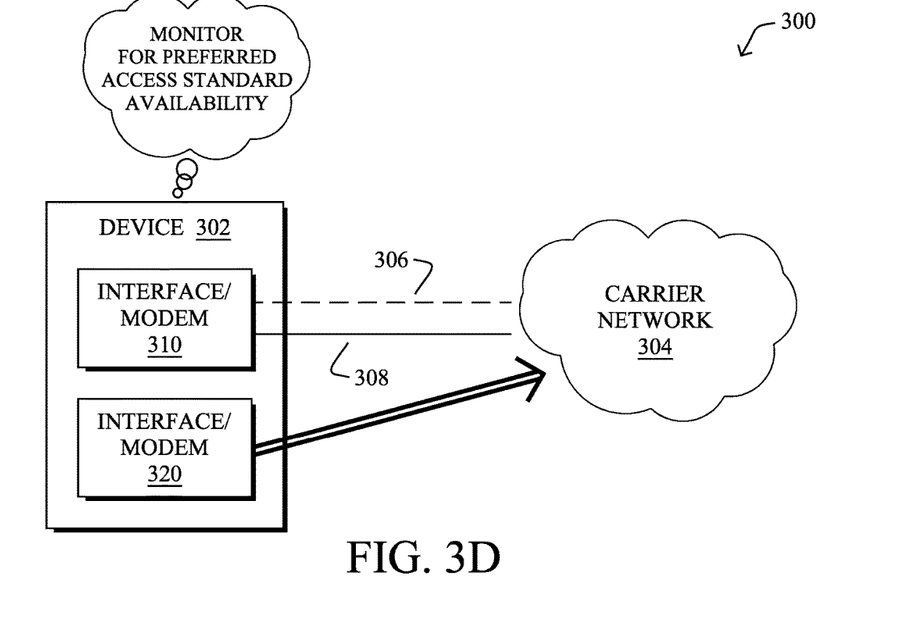

As appropriately configured, the device may utilize the second network interface in order to monitor for the availability of the preferred access standard. In particular, as shown in FIG. 3D, interface/modem 320 of device 302 may, in some embodiments, identify when preferred access standard 306 is again available for interface/modem 310 to access carrier network 304. In this way, by using a second network interface, connectivity and access to the carrier network by the device (by interface/modem 310 using secondary access standard 308) is not interrupted while the device attempts to determine when the preferred wireless access standard has become available again and to switch back. Furthermore, identifying the availability of the preferred standard can be repeated as often as needed. For example, if the interface/modem 320 determines that access using the preferred access standard is not yet available, the modem may check again at a later time, all without interrupting the connection to the carrier network. As such, in some embodiments, the techniques described herein may be implemented in a loop, with the number and frequency of repetitions based, at least in part, on a user-defined timing and schedule (e.g., using a timer or counter) thereby providing the user with some control over how often to check for availability and accordingly, what further actions may be needed should the preferred access standard remain unavailable.

Figure 3E:
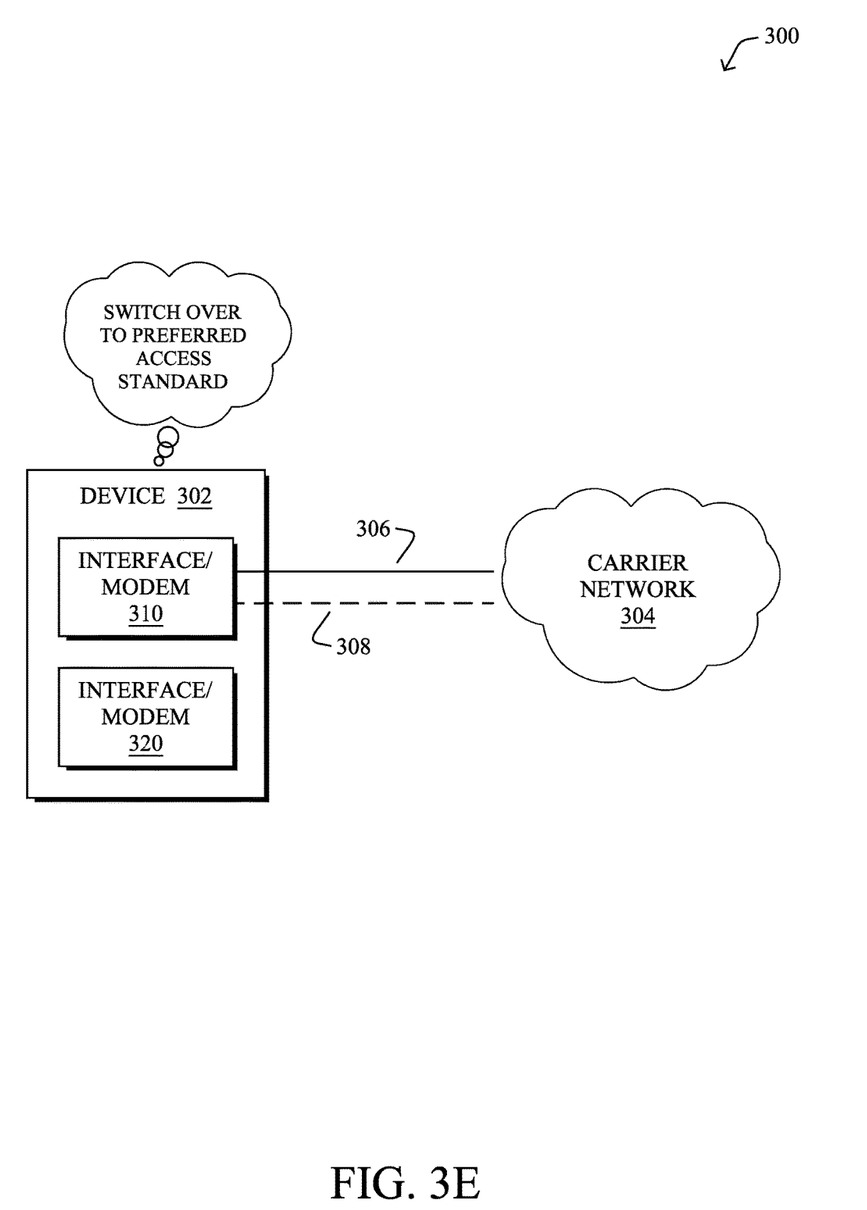

As shown in FIG. 3E, once the second network interface has determined that the preferred wireless access standard has again become available, the device may cause the first network interface to switch back. Thus, in some embodiments, device 302 may cause interface/modem 310 to switch over to using preferred access standard 310 based on the identification by interface/modem 320 that the preferred access standard is again available. This dramatically minimizes the downtime of the device by increasing the likelihood of a successful switchover at the appropriate time.

As a more concrete example, Cisco CGR 1120 or CGR1240 routers, which can include IoT router modules IR829-2LTE and CGM-4G, include two multi-RAT cellular modems for wireless connections to 4G (LTE) or 3G (UMTS) networks of the same or different carriers based on inserted SIM cards. In addition, these modems may also be programmed with a carrier specific firmware, which will have bands corresponding to the specific carriers enabled, or with a generic firmware, which will have all bands supported by the modem enabled. Both these modems may be operated independently using different cellular interfaces and may, in some cases, be used for load balancing or as a backup to each other.

These routers may also include a searching feature, such as a Public Land Mobile Network (PLMN) search, which performs a scan of all of the cellular bands enabled by the modem firmware and identifies the available radio technology types (e.g., LTE, UMTS, GSM etc), Mobile Country Codes (MCC) and Mobile Network Codes (MNC) corresponding to the radio type, etc. For example, a sample output may be:

```
Router#cellular 0 lte plmn search
Searching for available PLMNs.This may take up to 3 minutes.
Please wait......................
PLMN search done. Please use "show cellular 0 network" to see available PLMNS
Router#sh cellular 0 network detail
Available PLMNs at : 18:57:59 UTC Wed Nov 9 2016
Idx MCC MNC RAT Roaming Forbidden Preferred Desc
1 310 410 lte H NF P AT&T
2 310 410 umts H NF P AT&T
3 310 410 gsm H NF P AT&T
4 310 260 gsm R NF NP T-Mobile
5 310 260 lte R NF NP T-Mobile
6 311 480 lte R NF NP Verizon
7 310 260 umts R NF NP T-Mobile
```

Applying the techniques herein, the following pseudo code could be used, whereby M1 is modem 1, M2 is modem 2 is m2, and PRAT is the preferred radio access technology (RAT) defined by the user and enforced on m1:

```
Predefined variables: PRAT (User Preferred RAT) -> LTE/WCDMA
While (modems__m1__m2__are__up) {
Read__M1__PLMN__values -----> Store this value to use while selecting PRAT
if (M1__Current__cell__tech == PRAT) { ----> M1 is with already with Preferred Technology. No Action Needed
Exit;
} else if (M1__carrier != M2__carrier) { ----> To scan the bands supported by M1
Check__and__upgrade m2__to__generic__firmware
} else {
Do __PLMN__Search__m2
```

```
if (PRAT available) {
Do_PLMN_select_on_m1_to_PRAT
Do_revert_m2_old_fimware ----> To resume the trafifc on M2
Sleep 60
if(m1_state == attached) {
Exit;
} else {
Do_set _m1_RAT_to_auto ----> to resume the traffic on M1
    }
   }
  }
}
```

In some embodiments, the features described above may be implemented in a loop, with a timer and counter defined by the user. This may give the user the control of how frequently to check if M1 is on the PRAT and take any corresponding action.

Figure 4:
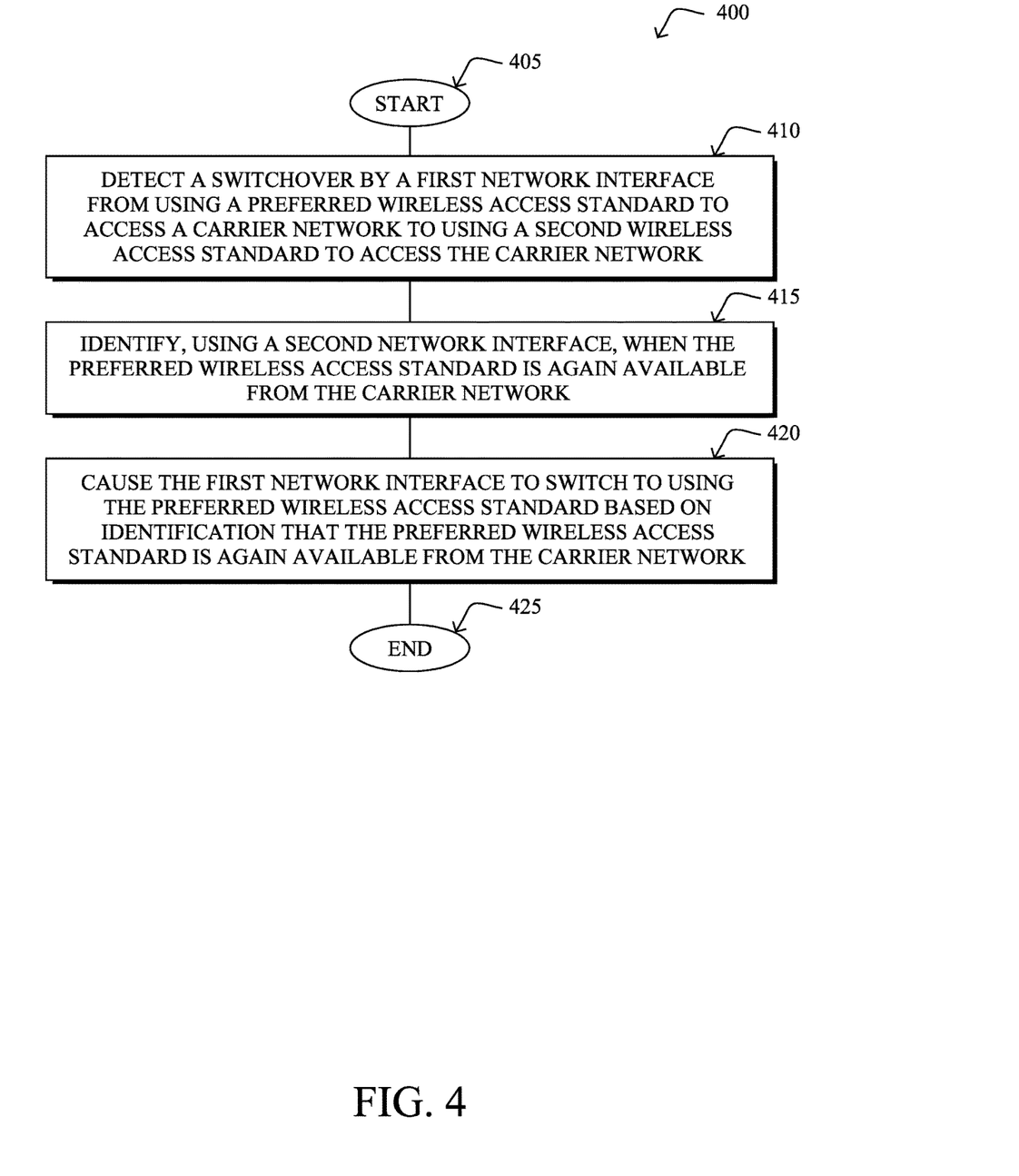
FIG. 4 illustrates an example simplified procedure for carrier network switchover.

FIG. 4 illustrates an example simplified procedure for carrier access switchover in accordance with one or more embodiments described herein. For example, a non-generic, specifically configured device (e.g., device 200) may perform procedure 400 by executing stored instructions (e.g., process 248). The procedure 400 may start at step 405 and continue to step 410, where, as described in greater detail above, a device having a first and a second network interface detects a switchover by the first network interface from using a preferred wireless access standard to using a second wireless access standard. The device may be a router, and the network interfaces may be modems, each configured to connect to the same or different carrier networks. The first network interface may switch over based, for example, on a loss of coverage or carrier availability.

At step 415, as described in more detail above, the device identifies, using the second network interface, when the preferred wireless access standard is again available from the carrier network. In this way, the device may use the second network interface to monitor for availability and proper timing for a switch over by the first network interface back to using the preferred access standard while the device remains connected to the carrier network by the first network interface using the less preferred secondary access standard. In some embodiments, if the second network interface is not configured to access the same carrier network as the first network interface, the device may update or configure the interface as needed in order to access that carrier network. Furthermore, as described in more detail above, identification of the availability of the preferred access standard may be repeated as often as needed until a positive determination of availability is made.

At step 420, based on the identification by the second network interface that the preferred wireless access standard is again available from the carrier network, the device may cause the first network interface to switch to using the preferred wireless standard. Thus, the device, which had initially detected a switchover by the first network interface away from using the preferred access standard due to lack of availability, may cause the first network interface to switch back to using the preferred access standard when the second network interface determines that availability has returned. Procedure 400 then ends at step 425.

It should be noted that while certain steps within procedures 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Thus, the carrier access switchover techniques of the present disclosure provide a convenient and efficient determination of when a lost preferred access standard is once again available for use by a device, with minimal repeated downtime. As noted above, based on the standards, it is often required that a modem stop receiving data for a particular time period in order to switch to a preferred access standard. However, it is not always convenient or, in some cases, even possible to stop data from being sent/received over some cellular interfaces, particularly for many IoT networks. Furthermore, there is no way to readily determine when the modem should attempt to reselect to the best technology, and switching back to using a previously lost preferred access standard typically becomes a hit-or-miss prospect. With the techniques described herein, a device may use a first network interface accessing a carrier network using a secondary access standard and may use another network interface to monitor and identify when a preferred access standard has again become available. In this way, the device remains connected to the carrier network and only attempts a switchover when it has been determined that the preferred access technology is again available for use.

While there have been shown and described illustrative embodiments that provide for a carrier access switch over to a preferred access standard, it is to be understood that various other adaptations and modifications may be made within the spirit and scope of the embodiments herein. For example, while certain embodiments are described herein with respect to using certain devices in an LLN, the embodiments may, in fact, be used in any type of network in which access to carrier networks can sometimes be lost. Also, other types of network access technologies, besides the described wireless access standards, may be used.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
  detecting, by a device having a first and a second network interface, a switchover by the first network interface from using a preferred wireless access standard to access a carrier network to using a second wireless access standard to access the carrier network, wherein the device is an Internet of Things (IoT), the first network interface is a first modem and the second network interface is a second modem;
  identifying, by the device using the second network interface, whether the preferred wireless access standard is again available from the carrier network by repeated monitoring for availability of the preferred wireless access standard based on a defined timing schedule implemented by a timer; and causing, by the device, the first network interface to switch to using the preferred wireless access standard based on identification by the second network interface that the preferred wireless access standard is again available from the carrier network.

2. The method of claim 1, wherein the first and the second network interface are configured to access the carrier network.

3. The method of claim 1, wherein the first network interface is configured to access the carrier network and the second network interface is configured to access an alternative carrier network different from the carrier network.

4. The method of claim 3, further comprising:
configuring, by the device, the second network interface to access the carrier network.

5. An apparatus, comprising:
a first network interface and a second network interface to access a carrier network;
a processor coupled to the network interfaces and configured to execute one or more processes; and
a memory configured to store a process executable by the processor, the process when executed configured to:
detect a switchover by the first network interface from using a preferred wireless access standard to access the carrier network to using a second wireless access standard to access the carrier network, wherein the apparatus is an Internet of Things (IoT) router, the first network interface is a first modem and the second network interface is a second modem;
identify using the second network interface whether the preferred wireless access standard is again available from the carrier network by repeated monitoring for availability of the preferred wireless access standard based on a defined timing schedule implemented by a timer; and
cause the first network interface to switch to using the preferred wireless access standard based on identification by the second network interface that the preferred wireless access standard is again available from the carrier network.

6. The apparatus of claim 5, wherein the first and the second network interface are configured to access the carrier network.

7. The apparatus of claim 5, wherein the first network interface is configured to access the carrier network and the second network interface is configured to access an alternative carrier network different from the carrier network.

8. The apparatus of claim 7, wherein the process when executed is further operable to:
configure the second network interface to access the carrier network.

9. A tangible, non-transitory, computer-readable media having software encoded thereon, the software when executed by a device in a network configured to:
detect a switchover by the first network interface from using a preferred wireless access standard to access the carrier network to using a second wireless access standard to access the carrier network, wherein the device is a router, the first network interface is a first modem and the second network interface is a second modem;
identify using the second network interface whether the preferred wireless access standard is again available from the carrier network by repeated monitoring for availability of the preferred wireless access standard based on a defined timing schedule implemented by a timer; and
cause the first network interface to switch to using the preferred wireless access standard based on identification by the second network interface that the preferred wireless access standard is again available from the carrier network.

10. The tangible, non-transitory, computer-readable media of claim 9, wherein the first and the second network interface are configured to access the carrier network.

11. The tangible, non-transitory, computer-readable media of claim 9, wherein the first network interface is configured to access the carrier network and the second network interface is configured to access an alternative carrier network different from the carrier network.

12. The tangible, non-transitory, computer-readable media of claim 11, wherein the software when executed is further operable to:
configure the second network interface to access the carrier network.

* * * * *